W. H. CLOKE.
Fastening Bottoms in Boilers.

No. 198,794  Patented Jan. 1, 1878.

Witnesses:  Inventor:

UNITED STATES PATENT OFFICE.

WILLIAM H. CLOKE, OF RAHWAY, NEW JERSEY.

IMPROVEMENT IN FASTENING BOTTOMS IN BOILERS.

Specification forming part of Letters Patent No. 198,794, dated January 1, 1878; application filed November 23, 1876.

*To all whom it may concern:*

Be it known that I, WILLIAM H. CLOKE, of Rahway, in the county of Union and State of New Jersey, have invented a certain Improvement in Fastening Bottoms in Plumbers' House-Boilers, of which the following is a specification:

My invention relates to an improvement in fastening bottoms in that class of boilers known as "plumbers' house-boilers," which are usually made of copper.

Figure 1:
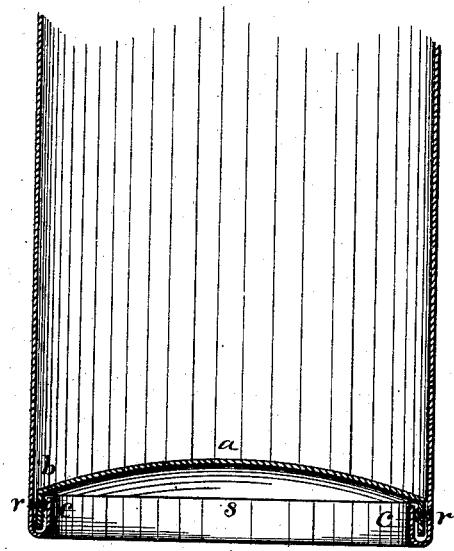
Figure 2:
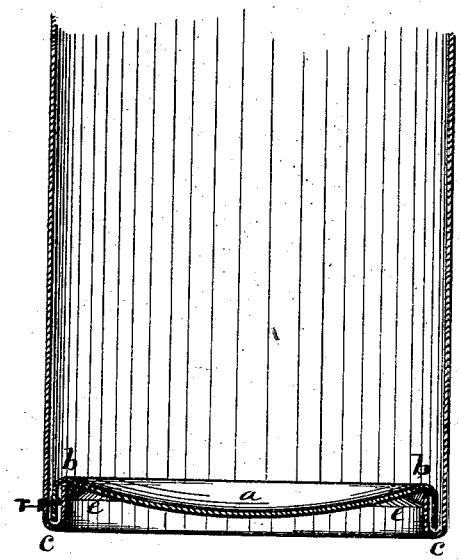

In the accompanying drawings, Figure 2 shows the old method of fastening in said boilers; and Fig. 1 shows my new and improved method, both drawings being made a vertical section through the axis of a cylindrical upright house-boiler, but not extending to the top.

In the old method of fastening, as shown in Fig. 2, the bottom $a$, which is concave to the pressure, has its edge turned down all round to a line parallel with the cylinder into which it is to be inserted, as shown at $b\ b$. It is inserted sufficiently far into the cylindrical part of the boiler to enable the operator to turn in the cylinder, as shown at $c\ c$, thereby making a clinch or lock joint, which is rendered water-tight by turning the boiler bottom up, and filling the space $e\ e$ with melted solder, and "sweating" it into the joints formed by turning the edge of the bottom and cylinder in opposite directions. The defect in this method of fastening is, that when the boiler is subjected to internal pressure the solder peels away from the cylindrical part of the boiler at its junction with the bottom, thereby destroying the joint.

In my new and improved method of fastening in the bottom, as shown in Fig. 1, I make the bottom $a$ convex to the pressure of the water. Consequently the hydraulic pressure has a tendency to enlarge instead of diminish the diameter, which, of course, prevents the peeling of the solder from the cylindrical part at its upper point of junction with the bottom, as shown at $b$. The bottom and cylinder are further prevented from separating by the rivets $r\ r$, which are placed about half an inch apart all around the joint, as shown.

After the riveting is completed the cylindrical part is turned down over the heads of the rivets, as shown at $c\ c$, Fig. 1. The joint is completed by simply immersing the joint in a vessel of melted solder to the level of the line $s$, as shown in Fig. 1, when, by the force of gravity and capillary attraction, the solder will fill all the space in the joint, thereby making a perfectly tight and durable joint.

What I claim as my invention, and desire to secure by Letters Patent, is—

The combination of an upwardly-convex bottom, having a depending flange riveted to the inside of the body of the boiler, with the body bent inwardly, to embrace the flange and cover the rivets, and with solder applied at the upturned edge of the body, as and for the purpose set forth.

WILLIAM H. CLOKE.

Witnesses:
H. B. BANNARD,
W. E. CLARK.